UNITED STATES PATENT OFFICE.

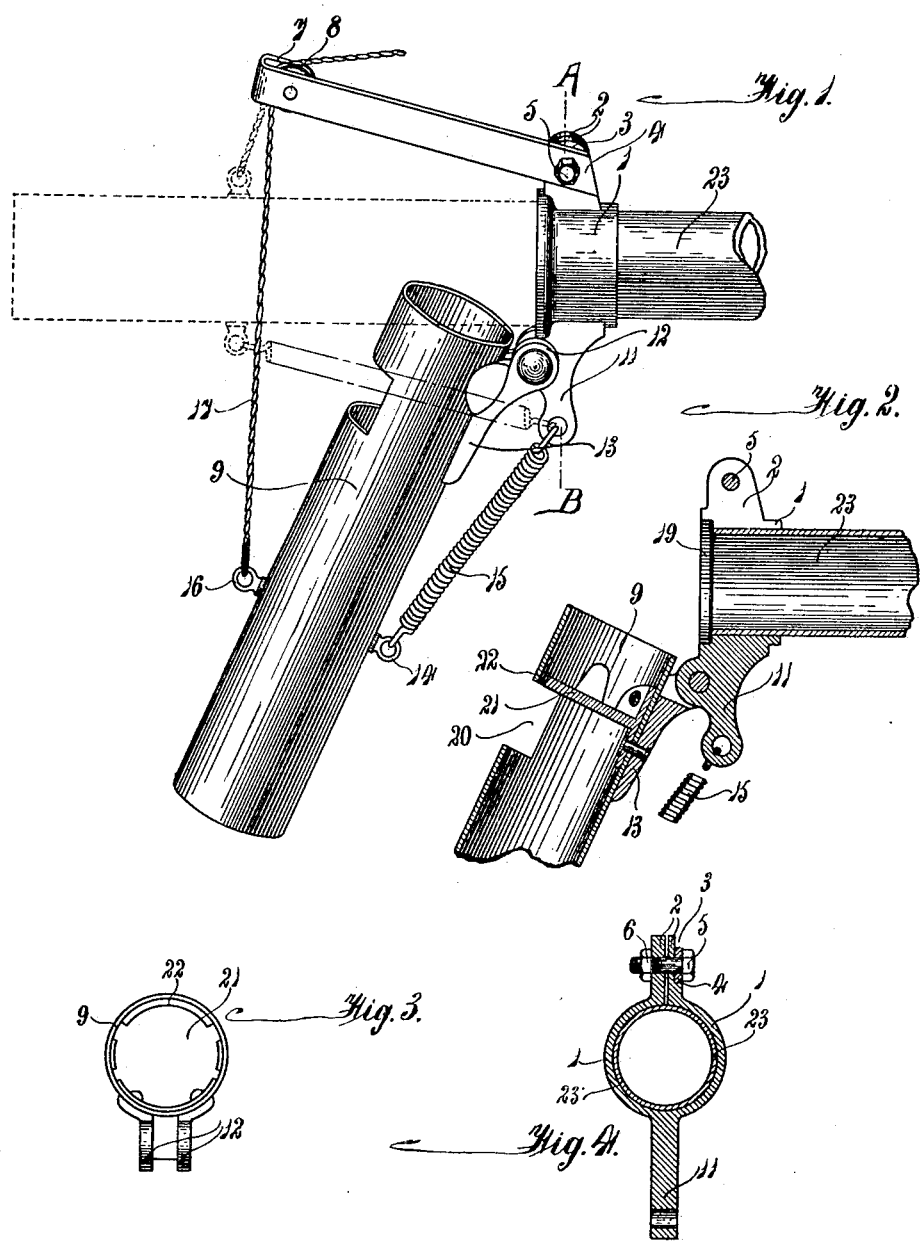

AUSTIN HAMILTON TRELOGGAN, OF HANDSWORTH, BIRMINGHAM, ENGLAND.

EXHAUST-WHISTLE.

1,120,424.   Specification of Letters Patent.   Patented Dec. 8, 1914.

Application filed November 3, 1913. Serial No. 798,931.

*To all whom it may concern:*

Be it known that I, AUSTIN HAMILTON TRELOGGAN, subject of the King of Great Britain, residing at Ivanhoe, South Road, Handsworth, Birmingham, in the county of Warwick, England, have invented a new and useful Exhaust-Whistle; and I do hereby declare the following to be a full, clear, and exact description of the same.

My invention comprises improvements in exhaust whistles for motor vehicles and the like and refers to that class of such which embody a longitudinally split clip member adapted to embrace the extremity of the exhaust pipe and to which clip member the whistle body is secured by a hinge, mechanism being provided whereby the whistle may be brought into alinement with the exhaust pipe when it is desired to blow same, the object of the present invention being to provide an improved construction of such a whistle.

Referring to the drawings:—Figure 1 is a perspective view of an exhaust whistle according to this invention, in its normal position. Fig. 2 is a partial longitudinal section illustrating the hinge and adjacent parts. Fig. 3 is an interior view of the end of the whistle showing the diaphragm. Fig. 4 is a section at A—B in Fig. 1.

In carrying this invention into practice as illustrated upon the accompanying drawings, the clip 1 is longitudinally split and is of a size adapted to receive the extremity of the exhaust pipe of the motor vehicle. Adjacent to the longitudinal split in the clip are two lugs 2—2, the one lug being cut away at 3 to receive the arm 4, the arm 4 and lugs being drawn together so as to fasten the clip firmly around the exhaust pipe marked 23 by means of a screw 5 and nut 6. The arm 4 is thus positioned in such a direction that it over-hangs the body of the whistle, its extremity being turned over as at 7 and carrying a pulley 8, the purpose of which will be hereafter explained.

The whistle 9 is formed of a tube having a closed end and is connected to the clip by means of a hinge embodying a part 11 fastened to the clip or cast integral therewith, this part 11 fitting in the bifurcated ends 12 of the hinge portion 13 riveted or otherwise secured to the whistle body. The part 11 is connected to a small bracket member 14 on the whistle by means of the spiral spring 15, said spring normally retaining the whistle out of alinement with the exhaust pipe and permitting the exhaust gases to escape without passing through the whistle. On the opposite side of the whistle is another bracket 16 to which is connected a cable 17, which passes over the afore-mentioned pulley 8, being connected to a hand lever or other controlling device near to the driver by Bowden wire mechanism, or other means whereby the whistle may be brought into alinement by the exhaust pipe if so required, the end of the clip being recessed at 19 to receive the extremity of the whistle and prevent escape of the exhaust gases without passing through the whistle when the whistle is in its operative position.

The arm 4 being fastened to the clip portion it enables the whistle and its operative connections to be entirely mounted upon the exhaust pipe, the whistle being thus operative quite independently of other parts of the car as it would be if the pulley were attached to the body work or frame of the car.

The spring enables the whistle to be so mounted that when in its in-operative position it may hang downwardly making an angle with the exhaust pipe or it may be of any other suitable arrangement with same and the spring, being at a distance from the whistle and almost out of contact with same, will not be so liable to get hot as it would do if in close contact with the body portion of the whistle.

The whistle has one discharge outlet 20 and is fitted with a diaphragm portion 21, having a cut away portion 22 adjacent to the discharge opening.

What I claim then is:—

In an exhaust whistle for motor vehicles and the like, the combination of a longitudinally split clip adapted to embrace the exhaust pipe of the motor vehicle, and having an enlarged bore at its outer end corresponding with the external diameter of the whistle; a whistle proper of tubular form hinged to the clip in such manner that when the whistle is to be used it may be brought into alinement with the clip, the extremity of the whistle entering said part of enlarged bore; a diaphragm within the whistle; a bracket carried by the clip member, and serving to carry the hinge between the whistle and clip; a spiral spring connected to the bracket and to the whistle so as to normally retain the parts out of alinement; a flexible controlling cable connected to the whistle; a pair of lugs located one on each side of the longitudinal split in the clip; an arm carried by the clip member; a locking screw passing through said lugs and through the arm, and serving to contract the clip, and to simultaneously position the arm; and a pulley carried by said arm and acting as a guide for the flexible controlling cable employed to bring the whistle into alinement with the clip.

In testimony whereof, I have signed my name to this specification in the presence of two subscribing witnesses.

AUSTIN HAMILTON TRELOGGAN.

Witnesses:
 HAROLD J. C. FORRESTER,
 HERBERT J. O. BARTON.

Copies of this patent may be obtained for five cents each, by addressing the "Commissioner of Patents, Washington, D. C."